United States Patent [19]

Shibata et al.

[11] Patent Number: 5,523,871

[45] Date of Patent: Jun. 4, 1996

[54] LIQUID CRYSTAL DEVICE HAVING A UNIAXIAL ALIGNMENT POLYMER FILM WITH AT LEAST TWO SPECIES OF DOPANTS

[75] Inventors: Masaaki Shibata, Kanagawa-ken; Etsurō Kishi, Sagamihara; Satoshi Yuasa, Yokohama, all of Japan

[73] Assignee: Canon Kabushiki Kaisha, Tokyo, Japan

[21] Appl. No.: 253,290

[22] Filed: Jun. 3, 1994

[30] Foreign Application Priority Data

Apr. 6, 1993 [JP] Japan ................... 5-158181

[51] Int. Cl.$^6$ .................... G02F 1/1337; G02F 1/141
[52] U.S. Cl. .................................... 359/75; 359/78
[58] Field of Search ................... 359/75, 78, 100

[56] References Cited

U.S. PATENT DOCUMENTS

| | | | |
|---|---|---|---|
| 4,367,924 | 1/1983 | Clark et al. | 350/353 |
| 4,881,798 | 11/1989 | Yuasa et al. | 350/353 |
| 4,965,017 | 10/1990 | Holmes | 359/75 |
| 5,231,523 | 7/1993 | Nakaya | 359/75 |
| 5,239,398 | 8/1993 | Yanagisawa | 359/75 |
| 5,357,357 | 10/1994 | Imazeki | 359/75 |

*Primary Examiner*—Anita Pellman Gross
*Assistant Examiner*—Tiep H. Nguyen
*Attorney, Agent, or Firm*—Fitzpatrick, Cella, Harper & Scinto

[57] ABSTRACT

A liquid crystal device is constituted by a pair of substrates each having thereon an electrode and a uniaxial alignment film, and a chiral smectic liquid crystal disposed between the substrates. At least one of the uniaxial alignment films is a film comprising an electroconductive polymer doped with at least two species of dopants, which preferably include a first type dopant capable of dedoping into the liquid crystal due to electric field application or diffusion, and a second type dopant substantially incapable of dedoping into the liquid crystal. The resultant liquid crystal device is alleviated with respect to voltage hysteresis and is suitable for gradational display.

9 Claims, 3 Drawing Sheets

Ps-up (WHITE)　　　　Ps-down (BLACK)

LIQUID CRYSTAL DEVICE HAVING A UNIAXIAL ALIGNMENT POLYMER FILM WITH AT LEAST TWO SPECIES OF DOPANTS

FIELD OF THE INVENTION AND RELATED ART

The present invention relates to a liquid crystal device for use in a liquid crystal display device, a liquid crystal optical shutter, etc., particularly a chiral smectic liquid crystal device which has been improved in hysteresis in electrooptical response and in gradational display performance.

A type of liquid crystal device wherein the refractive anisotropy of a liquid crystal having a chiral smectic phase (i.e., a chiral smectic liquid crystal) is utilized to control the light quantity transmitted therethrough has been proposed by Clark and Largerwall (U.S. Pat. No. 4,367,924). A chiral smectic liquid crystal has a helical structure inherent in its chiral smectic C phase (SmC*) or H phase (SmH*) but has lost the helical structure in such a device. As a result, the chiral smectic liquid crystal is placed in an alignment state showing bistability, i.e., a property of assuming either one of a first optically stable state and a second optically stable state in response to an electric field applied thereto and maintaining such a state in the absence of an electric field, and also showing a faster responsiveness to the change in electric field compared with a conventional twisted-nematic (TN) liquid crystal. Accordingly, such a chiral smectic liquid crystal is expected to be utilized in a large-area, high-resolution display driven by a simple matrix scheme.

The chiral smectic liquid crystal causes a switching from one stable state to the other stable state when supplied with a voltage exceeding a certain value (an inversion threshold value Vth') and causes a back-switching from the other stable state to one stable state when supplied with a voltage exceeding a certain value (Vth') of an opposite polarity. The process of switching between the two stable states of a chiral smectic liquid crystal involves various microscopic phenomena inclusive of dielectric relaxation immediately after the voltage application, inversion of spontaneous polarization Ps, ionic movement in the liquid crystal layer, and stabilization of Ps after the inversion.

Further, a liquid crystal device includes electrodes for applying a voltage to the liquid crystal and alignment films for determining the initial state of the liquid crystal, so that the boundaries between the electrodes and the alignment films and between the alignment films and the liquid crystal provide barriers for electric charges (such as electrons and impurity ions) in the device giving trap levels.

Because of the above factors, the above-mentioned inversion thresholds Vth and Vth' depend largely on the previous states of the liquid crystal molecules concerned (more specifically the presence or absence and magnitude of the internal electric field) and the values of Vth and Vth' are not always identical to each other. Accordingly, when a liquid crystal device including pixels having two light transmission states (bright state and dark state) corresponding to the two stable states is subjected to a simple matrix drive, the pixels are caused to have different inversion threshold voltages depending on whether the pixels have been in the bright state or dark state before the inversion so that the applied voltage-transmittance (V-T) characteristic of pixels suffers from hysteresis or instability. In case of a binary display based on two states of bright and dark without performing a halftone display, there occurs no serious problem if the above-mentioned difference in inversion threshold voltage is suppressed to be below a difference between a voltage applied for causing inversion and a voltage applied for not causing inversion (a drive margin).

However, in the case of a halftone display, the problem cannot be solved by the above-mentioned measure. According to a method of gradational display, a desired halftone (i.e., an intermediate transmittance) may be displayed by modulating the amplitude or width of a voltage pulse applied to a pixel to provide a controlled ratio of areas of bright and dark regions in the pixel. While a chiral smectic liquid crystal inherently has a very steep applied voltage-transmittance (V-T) characteristic, a halftone display prefers a moderate slope of V-T characteristic curve between a voltage for initiating an inversion (threshold voltage) and a minimum voltage for causing a substantially complete conversion (saturation voltage). Different from the above-mentioned binary display using only the two states of bright and dark, in the case of a halftone display, the voltage applied at the time of selection varies depending on gradation data to be displayed, so that it is impossible to apply the above-mentioned method of "suppressing a difference in inversion threshold voltage below a drive margin". Moreover, because of the hysteresis and instability of the inversion threshold voltage, the applied voltage and the resultant halftone fail to satisfy a one-to-one correlation, so that the halftone display per se becomes unstable.

In order to solve the above-mentioned problem, there are also proposed the following methods:

(1) A signal voltage is always preceded by resetting a pixel concerned into one stable state (e.g., a dark state).

(2) An electroconductive alignment film is used so as to suppress the influence of an electric field (reverse electric field) within the liquid crystal layer caused by alignment of Ps of chiral smectic liquid crystal in one direction.

The above-mentioned methods have not yet provided a complete solution to the problem.

The reverse electric field is further explained with reference to FIGS. 6A and 6B. If it is assumed that the upward disposition of Ps (spontaneous polarization) represents a bright (white) display state as shown in FIG. 6A and the downward disposition of Ps represents a dark (black) display state as shown in FIG. 6B, the internal electric fields are mutually opposite in direction between the cases of the upward Ps disposition and the downward Ps disposition. Under the action of such an internal electric field, various impurities having electric charges in the liquid crystal layer and electric charges trapped at boundaries are caused to move within the liquid crystal layer. The movement of such unstable electric charge causes a reverse electric field as described above. The relaxation time of such electric charge movement is on the order of several hundred msec to several sec. In contrast thereto, the above-mentioned reset pulse (1) is on the order of 300 μsec or shorter so as to suppress the flicker of display, so that the localization of electric charge cannot be completely removed by the above-mentioned application of a reset pulse.

The method (2) may be achieved by using an alignment film comprising an electroconductive polymer so as to lower the impedance of the alignment film, thereby quickly relaxing the electric charge localized at the liquid crystal-alignment film boundary. Even by this method, however, it has been impossible to remove the hysteresis caused by the presence of an electric double layer or junction capacitance at or in the vicinity of the boundary between the liquid crystal layer and the alignment film.

SUMMARY OF THE INVENTION

An object of the present invention is to provide a liquid crystal device which is accompanied with little hysteresis in electrooptical response and is suitable for gradational display.

According to our experiments, it has been discovered that the kind or mechanism of hysteresis reduced by an electroconductive polymer containing a dopant can be varied depending on the species of the dopant.

According to the present invention based on the discovery, there is provided a liquid crystal device, comprising: a pair of substrates each having thereon an electrode and a uniaxial alignment film, and a chiral smectic liquid crystal disposed between the substrates, wherein at least one of the uniaxial alignment films is a film comprising an electroconductive polymer doped with at least two species of dopants.

A preferred combination of the two different species of dopant may comprise a dopant capable of dedoping into the liquid crystal and a dopant incapable of dedoping into the liquid crystal respectively by electric field application or diffusion.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
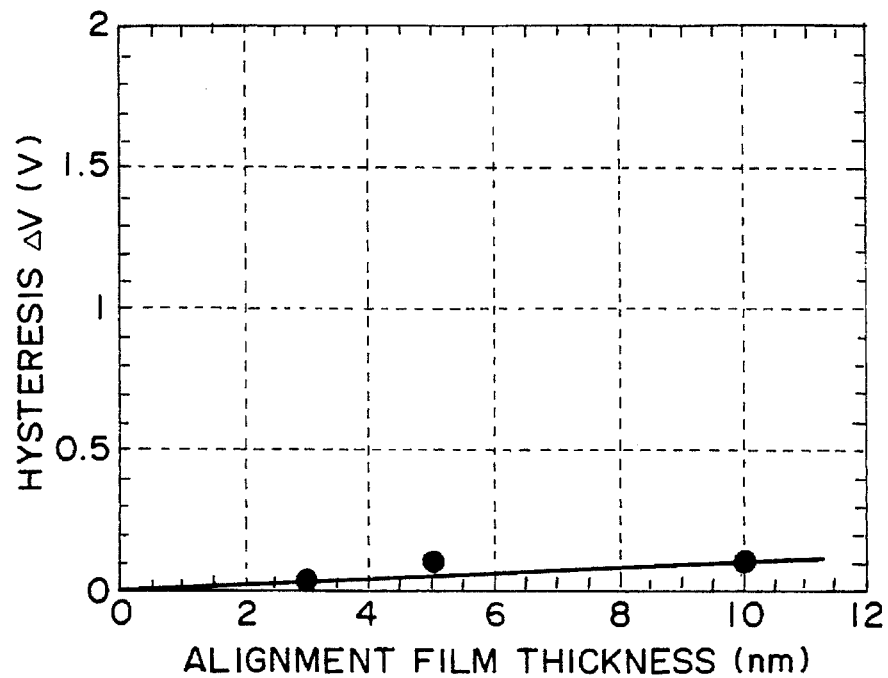
FIG. 1 is a graph showing a correlation between voltage hysteresis and alignment film thickness obtained in Example 1 according to the invention described hereinafter.

We consider that the removal or alleviation of hysteresis achieved by the present invention may be attributable to the following factors:

(1) The traps for electric charge at the boundary between the liquid crystal layer and the alignment film are reduced by the dopant.

(2) Unstable behavior of the charge-carrying impurities in the liquid crystal layer or alignment film is suppressed by the dopant.

(3) The switching between the two stable states can be completed in a shorter time by shortening of the relaxation time of the switching.

Every factor is considered to be related with behavior or movement of various charge carriers inclusive of the dopants but the mechanism has not been fully clarified as yet.

The electroconductive polymer used in the present invention may basically be of any type but may preferably be a polymer having a π electron conjugation in its molecular structure. Examples thereof may include polyaniline, polypyrrole, polyparaphenylene, polythiophene and derivatives of these polymers.

Such electroconductive polymers may be used singly or in mixture with each other or another polymer.

It is required that liquid crystal molecules are uniformly aligned uniaxially in the display area of a liquid crystal display device. In order to provide such an alignment, the electroconductive polymer alignment film is required to exhibit a sufficient uniaxial alignment control force at the boundary with the liquid crystal layer. Accordingly, it is sometimes advantageous to use the electroconductive polymer in mixture with a polymer which has been conventionally used as a uniaxial alignment film material, such as polyimide, polyamide or polyvinyl alcohol.

The alignment film comprising an electroconductive polymer is doped with at least two species of dopants which may preferably include a first type dopant and a second type dopant as follows:

The first type dopant comprises a substance which may enhance the electroconductivity of the electroconductive polymer and does not readily cause dedoping from or migration within the electroconductive polymer. Examples thereof may include polymers, such as polystyrenesulfonic acid, polyvinylsulfonic acid, cellulose acetate, polyacrylic acid, and polymaleic anhydride; and organic acid derivatives, typically organic acid salts, including a relatively large or bulky molecule, such as phthalocyanine or porphyrin in their skeleton.

The doping with the first type dopant may be performed by forming a mixture solution containing the dopant and the electroconductive polymer and applying the solution onto a substrate to form an alignment film if the dopant and the electroconductive polymer are soluble in a common solvent and are mutually soluble. As another method, the doping may be performed by forming the electroconductive polymer by electrolytic polymerization in an electrolytic solution containing the dopant. The above methods are not exhaustive, however.

The doping with the first type dopant may preferably be performed so as to provide a resistivity of at most $10^7$ ohm.cm, preferably on the order of $10^4$–$10^7$ ohm.cm, within an extent of not substantially inhibiting the alignment control power of the electroconductive polymer.

The second type dopant comprises a substance which has a larger mobility than the first type dopant in the electroconductive polymer and is capable of dedoping from the electroconductive polymer. It is particularly preferred that the dopant quickly causes a change in dopant concentration within the electroconductive polymer and also dedoping from the electroconductive polymer toward the exterior (boundary with the liquid crystal layer).

Examples of the second type dopant may include: protonic acids, such as $H_2SO_4$, $HCl$, $HNO_3$ and $CH_3COOH$; halogens, such as $Br_2$ and $I_2$; Lewis acids, such as $BF_3$ and $AsF_5$; and organic acid derivatives of a relatively small molecule, such as comphorsulfonic acid.

The doping with the second type dopant may be performed by dipping the electroconductive polymer film within a solution containing the dopant or exposing the electroconductive polymer film to a dopant vapor or a dopant-containing gaseous atmosphere for a prescribed period. These are however not exhaustive. The doping with the second type dopant may preferably be performed to such an extent of lowering the resistivity of the electroconductivity already containing the first type dopant by at least one digit, i.e. $1/10$ or below.

Hereinbelow, the present invention will be described based on Example and Comparative Examples.

EXAMPLE 1

Three pairs of glass plates each coated with an ITO electrode by sputtering were further coated with polyaniline.

Incidentally, polyaniline used in this example is soluble in an organic solvent such as N-methylpyrrolidone (NMP) and shows a resistivity of $10^9$ ohm.cm in a non-doped state. Further, a polyaniline film may be doped by a pre-doping method wherein a solution of polyaniline is doped with a dopant such as an organic acid or a polymer acid and then applied onto a substrate to form a doped film, or by a post-doping method wherein a polyaniline film formed on a substrate is dipped in a solution of such an acid or retained in an atmosphere of such an acid. Thereby, such a polyaniline film may be provided with an enhanced electroconductivity.

In this Example, pre-doped solutions containing polyaniline at concentrations of 0.5 wt. % and 1 wt. %, respectively, in a mixture solvent of NMP/n-butyl cellosolve (=1/1) and polystyrenesulfonic acid in an amount of 10 mol. % of the polyaniline were filtrated and then applied onto the three pairs of ITO-coated glass substrates by spin coating at 1500–2000 rpm/min for 20 sec. After the coating, the three pairs of substrates were dried at 80° C. for 15 min. to 3 nm (0.5 wt. % –2000 rpm), 5 nm (0.5 wt. % –1500 rpm) and form doped polyaniline films in thicknesses of 10 nm (1.0 wt. % –2000 rpm), respectively. and 10 nm, respectively.

Then, the coated substrates were dipped within 1N-sulfuric acid solution to effect post-doping of the polyaniline films. After the dipping, the substrates were washed with water, dried at 80° C. for 10 min. and then subjected to post-baking at 65° C. for about 13 hours under a reduced pressure in a vacuum oven. The post-baking was performed in order to reduce the change with time of electroconductivity of the doped polyaniline films. The resultant doped polyaniline alignment films showed a resistivity of $10^1$ ohm.cm.

Then, the doped polyaniline films on the substrates were respectively subjected to rubbing in one direction with a rubbing roller coated with a nylon cloth under the conditions of a roller revolution speed of 1000 RPM, a substrate feed rate of 16 mm/sec and a roller pressing depth of 0.4 mm.

Each pair of the thus-treated substrates were applied to each other with a spacing of 1.4 μm by disposing spacer silica beads therebetween so that their rubbing directions are parallel in the same direction to form a blank cell, which was then filled with a chiral smectic liquid crystal in isotropic phase (at 80° C.).

The chiral smectic liquid crystal was of a short pitch type showing a chiral smectic pitch of ca. 0.35 μm, Ps=71 nC/cm² a tilt angle of 26 degrees (at 25° C.) and the following phase transition series:

isotropic phase→SmA→SmC*→crystal.

The liquid crystal provided a uniform alignment with a stripe-shaped texture in SmC* phase after being gradually cooled from the isotropic phase under application of an AC electric field of 20 V/μm and ca. 10 Hz and showed a high contrast display characteristic of an apparent tilt angle θa=26 degrees.

Figure 2:
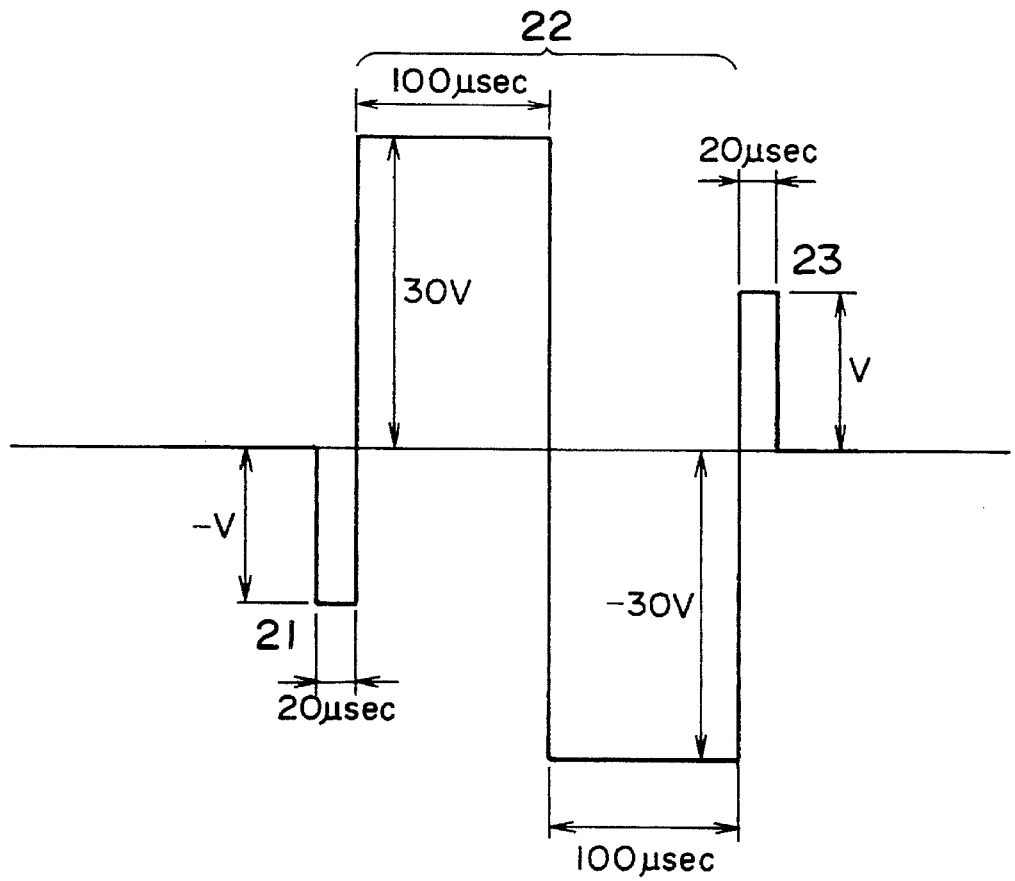
FIG. 2 is a diagram showing a drive voltage waveform used in Example 1.

The thus-prepared three liquid crystal cells were respectively sandwiched between a pair of right-angle cross nicol polarizers, and the transmittance therethrough was examined by applying thereto a test drive voltage waveform shown in FIG. 2. The test drive waveform included an auxiliary pulse 21 of a varying amplitude –V, a bipolar reset pulse 22 and a writing pulse 23 of a varying amplitude V for writing toward "white". The auxiliary pulse 21 was of a polarity opposite to that of the writing pulse 23 and was used to remove the DC component of the entire drive waveform. The reset pulse 22 was used for once resetting the display state of the cell into a black state. The electrooptical response of each cell was examined by applying the drive wave form shown in FIG. 2 while varying the amplitude V of the writing pulse 23 and the auxiliary pulse 21 in two cases of leaving the cell standing in the black state and in the white state, respectively, for three seconds. The transmittance (T) was measured in the latched state of the cell after standing for at least 30 msec after the application of the drive waveform. In this way, two V-T (applied voltage-transmittance) characteristic curves were obtained for each cell in the cases of after standing in the black state and the white state, respectively. The quantity of hysteresis Δ V (volt) was measured for each cell as a difference between the applied voltages V (volt) for providing a prescribed transmittance of 50 % read from the two V-T characteristic curves (i.e., V after standing in the black state–V after standing in the white state).

The hysteresis quantities measured for the three cells are plotted versus the alignment film thicknesses in FIG. 1. As is understood from FIG. 1, the hysteresis ΔV was equally substantially zero regardless of the alignment film thickness. As a result of examination after the above measurement, the polyaniline alignment films in the cells showed resistivities on the order of $10^5$ to $10^6$ ohm.cm. It is assumed from comparison with the results in Comparative Examples 2 and 3, the doped polyaniline alignment films used in this Example were believed to realize the disappearance of capacitance at the liquid crystal/alignment film boundary and the reduction in electrical relaxation time constant in the liquid crystal devices in combination.

In the above-described Examples, the doped alignment film according to the present invention was disposed on both substrates, but a similar but somewhat inferior effect could be obtained also in case of provision of such a doped alignment film on only one of the substrates.

Comparative Example 1

Three liquid crystal cells were prepared in the same manner as in Example 1 except that an undoped polyaniline alignment film showing a resistivity of ca. $10^9$ ohm.cm was disposed on both substrates.

Figure 3:
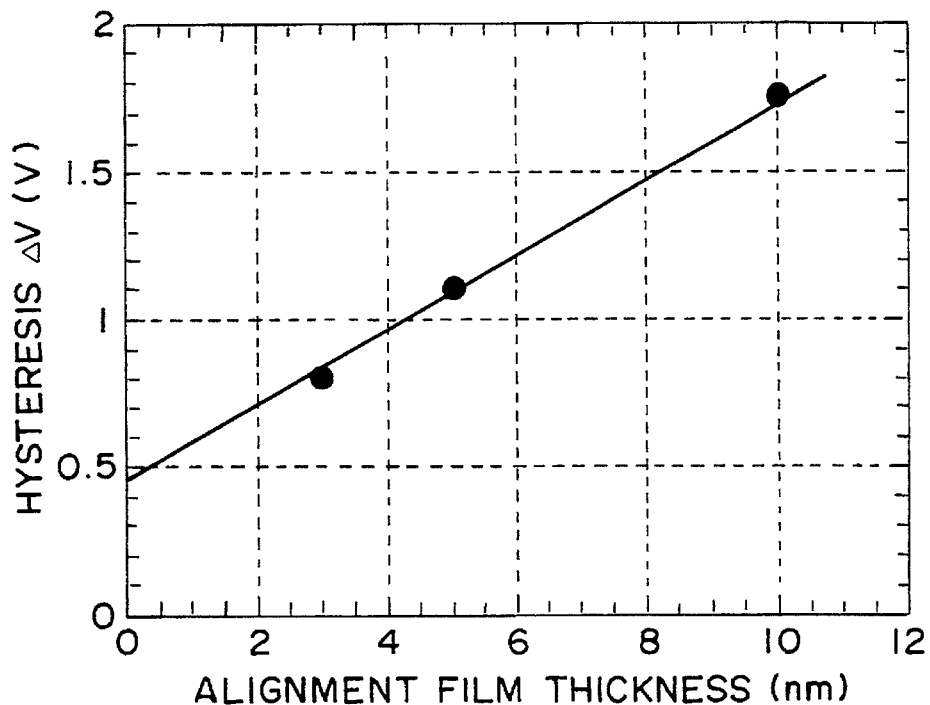
FIGS. 3–5 are graphs showing a correlation between voltage hysteresis and alignment film thickness obtained in Comparative Examples 1–3, respectively, described hereinafter.

As a result of measurement of the electrooptical response characteristics in the same manner as Example 1, the cells showed the hysteresis quantity shown in FIG. 3 increasing linearly depending on the alignment film thickness. Moreover, the extrapolation of the plots to an alignment film thickness of zero does not provide a hysteresis of zero but provides a substantial hysteresis ΔV of ca. 0.5 volt. This implies the presence of a capacitance at the liquid crystal/alignment film boundary.

Comparative Example 2

Three liquid crystal cells were prepared in the same manner as in Example 1 except that polyaniline alignment film without being subjected to pre-doping was formed on the substrates and subjected to only the post-doping in the same manner as in Example 1. The post-doped polyaniline alignment film showed a resistivity of ca. $10^1$ ohm.cm.

Figure 4:
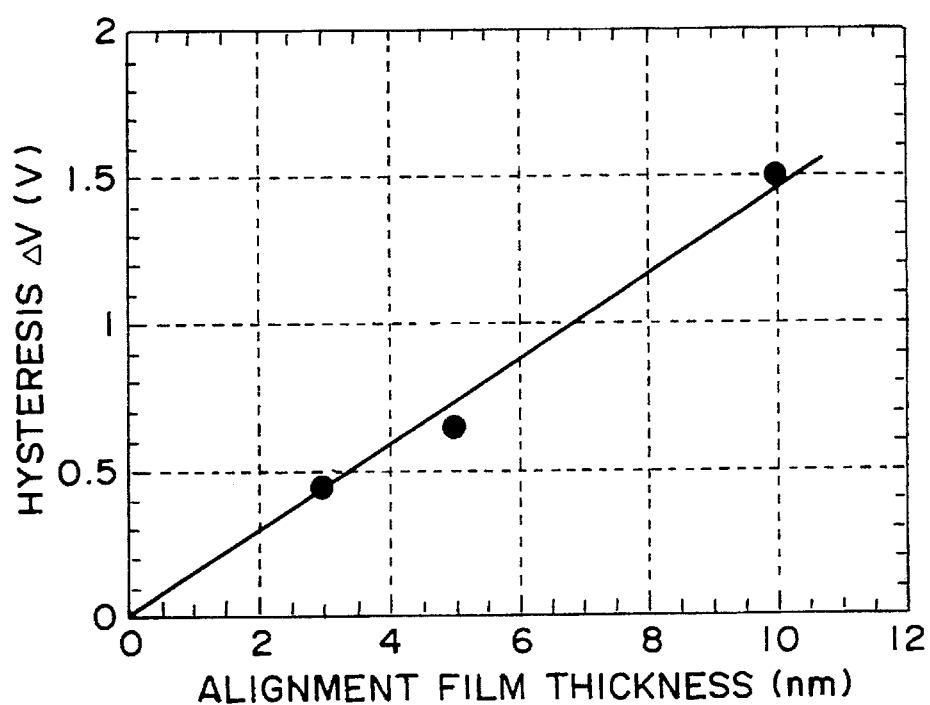

As a result of measurement of the electrooptical response characteristics in the same manner as Example 1, the cells showed the hysteresis quantities plotted in FIG. 4 increasing linearly as the increase in alignment film thickness. However, the extrapolation of the plots to an alignment film thickness of zero provides a hysteresis quantity ΔV of substantially zero, thus indicating that the capacitance present at the liquid crystal/alignment film boundary disappeared by the post-doping.

As a result of examination after the above measurement of the electrooptical response characteristic, the alignment films showed a resistivity of ca. $10^9$ ohm.cm similar to that before the post-doping. Accordingly, it is believed that most of the dopant ($SO_4^{2-}$) present in the alignment film caused de-doping to the liquid crystal.

The correlation between the de-doping and the disappearance of the boundary capacitance has not been clarified yet. It may be however presumed that the reduction of charge traps and the change in quantity of charge-carrying impurities relating to the boundary capacitance were reduced by the dedoping.

Comparative Example 3

Three liquid crystal cells were prepared in the same manner as in Example 1 except that polyaniline alignment film subjected to pre-doping was formed on the substrates in the same manner as in Example 1 but not subjected to post-doping. The pre-doped polyaniline alignment film showed a resistivity of ca. $10^6$ ohm.cm.

Figure 5:
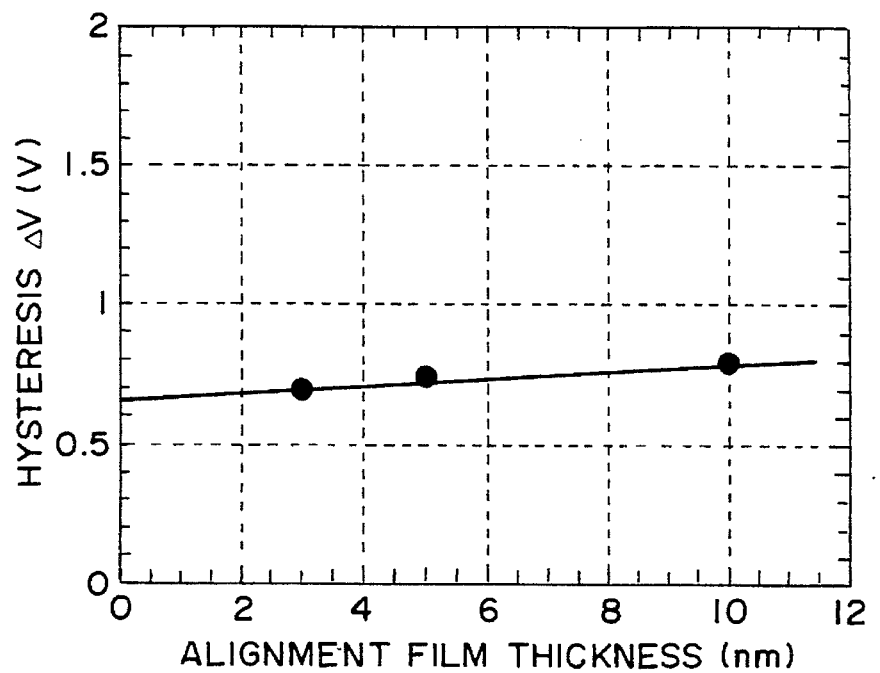
Figures 6A, 6B:
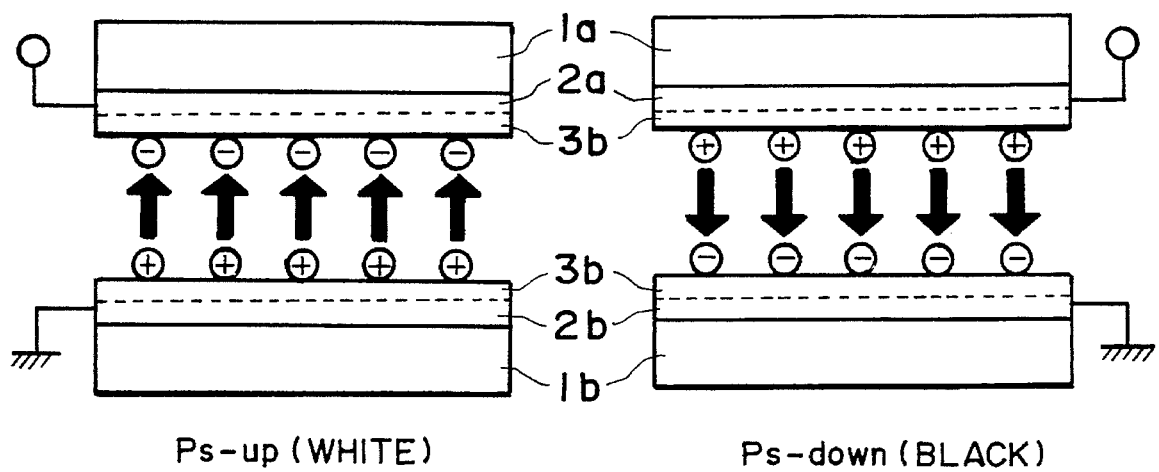
FIGS. 6A and 6B are schematic illustrations of polarization states in a liquid crystal device.

As a result of measurement of the electrooptical response characteristics in the same manner as in Example 1, the cells showed the hysteresis quantities plotted in FIG. 5 which were substantially unchanged regardless of the alignment film thicknesses as clearly different from the results in Comparative Examples 1 and 2.

As a result of examination after the measurement of the electrooptical response characteristic, the alignment films showed a resistivity of ca. $10^6$ ohm.cm which had not substantially changed from the value before the measurement. This is presumably because the mobility of charge-carrying impurities was increased, and an internal electric field in the cell principally controlled by the unstable movement of such impurities was not substantially affected by the behavior of charge carriers in the alignment film.

However, as a substantial hysteresis ΔV still remained, this may be attributable to the remaining of a capacitance at the liquid crystal/alignment film boundary.

What is claimed is:

1. A liquid crystal device, comprising: a pair of substrates each having thereon an electrode and a uniaxial alignment film, and a chiral smectic liquid crystal disposed between the substrates, wherein at least one of the uniaxial alignment films is a film comprising an electroconductive polymer doped with at least two species of dopants, and wherein said at least two species of dopants include a first type dopant capable of dedoping into the liquid crystal due to electric field application or diffusion, and a second type dopant substantially incapable of dedoping into the crystal.

2. A liquid crystal device according to claim 1, wherein the doping of the electroconductive film is performed by a mixture of the electroconductive polymer and another polymer, doped with said at least two species of dopants.

3. A liquid crystal device comprising: a pair of substrates each having thereon an electrode and a film, and a chiral smectic liquid crystal disposed between the substrates, wherein at least one of the films is a uniaxial alignment film comprising an electroconductive polymer doped with a first type dopant and a second type dopant, wherein the first type dopant comprises a member selected from the Group constituting off $H_2SO_4$, HCl, $HNO_3$, $CH_3COOH$, halogen, Lewis acid, and organic acid derivative, and the second type dopant comprises a member selected from the group consisting of polystyrenesulfonic acid, polyvinylsulfonic acid, cellulose sulfate, polyacrylic acid, polymaleic anhydride and organic acid derivative.

4. A liquid crystal device according to claim 3, wherein the organic acid derivative comprises an organic acid salt of phthalocyanine or porphyrin.

5. A liquid crystal device, comprising: a pair of substrates each having thereon an electrode and a film, and a chiral smectic liquid crystal disposed between the substrates, wherein an least one of the films is a uniaxial alignment film comprising an electroconductive polymer doped with at least two species of dopants, and said at Least two species of dopants include a first type dopant capable of dedoping into the liquid crystal due to electric field application or diffusion, and a second type dopant which is substantially incapable of dedoping into the liquid crystal and enhances the electroconductivity of the electroconductive polymer.

6. A liquid crystal device comprising: a pair of substrates each having thereon an electrode and a film, and a chiral smectic liquid crystal disposed between the substrates, wherein at least one of the films is a uniaxial alignment film comprising an electroconductive polymer doped with a first type dopant and a second type dopant, said electroconductive polymer comprises polyaniline, the first type dopant comprises a member selected from the group consisting of $H_2SO_4$, HCl, $HNO_3$, $CH_3COOH$, halogen, Lewis acid, and organic acid derivative; and the second type dopant comprises a member selected from the group consisting of polystyrenesulfonic acid, polyvinylsulfonic acid, cellulose sulfate, polyacrylic acid, polymaleic anhydride and organic acid derivative.

7. A liquid crystal device according to any one of claims 1, 3, 5 or 6, wherein said uniaxial alignment film comprises a mixture of said electroconductive polymer and another polymer.

8. A liquid crystal device according to any one of claims 1, 2, 3, 5 or 6, wherein said liquid crystal is a liquid crystal causing a phase transition from isotropic phase to smectic A phase on temperature decrease.

9. A liquid crystal device according to any one of claims 1, 2, 3, 5 or 6, wherein said uniaxial alignment film has been subjected to rubbing.

* * * * *

UNITED STATES PATENT AND TRADEMARK OFFICE
CERTIFICATE OF CORRECTION

PATENT NO. : 5,523,871
DATED : June 4, 1996
INVENTOR(S) : MASAAKI SHIBATA ET AL.   Page 1 of 2

It is certified that error appears in the above-identified patent and that said Letters Patent is hereby corrected as shown below:

On the title page: Item

AT [56] REFERENCES CITED

U.S. Patent Documents,
"Yanaglsawa" should read --Yanagisawa--.

COLUMN 1

Line 18, "Largerwall" should read --Lagerwall--.

COLUMN 4

Line 55, "comphorsulfonic" should read --camphorsulfonic--.

COLUMN 5

Line 24, "to 3" should read --to form doped polyaniline films in thicknesses of 3--.
Line 26, "form doped polyaniline films in thickness of" should be deleted.
Line 27, "and 10 nm, respectively." should be deleted.
Line 50, "nC/cm$^2$" should read --nC/cm$^2$,--.

UNITED STATES PATENT AND TRADEMARK OFFICE
CERTIFICATE OF CORRECTION

PATENT NO.   : 5,523,871
DATED        : June 4, 1996
INVENTOR(S)  : MASAAKI SHIBATA ET AL.          Page 2 of 2

It is certified that error appears in the above-identified patent and that said Letters Patent is hereby corrected as shown below:

COLUMN 8

Line 8, "Group" should read --group--.
    Line 27, "Least" should read --least--.

Signed and Sealed this

Twelfth Day of November, 1996

Attest:

BRUCE LEHMAN

Attesting Officer          Commissioner of Patents and Trademarks